(12) United States Patent  (10) Patent No.: US 8,106,528 B2
Liu  (45) Date of Patent: Jan. 31, 2012

(54) HORIZONTAL AXIS WIND TURBINE WITH ROTATABLE TOWER

(75) Inventor: Kuo-Shen Liu, Taipei (TW)

(73) Assignee: Houly Co., Ltd., Taipei (TW)

( * ) Notice: Subject to any disclaimer, the term of this patent is extended or adjusted under 35 U.S.C. 154(b) by 413 days.

(21) Appl. No.: 12/499,107

(22) Filed: Jul. 8, 2009

(65) Prior Publication Data

US 2011/0006536 A1    Jan. 13, 2011

(51) Int. Cl.
*F03D 11/04*    (2006.01)
(52) U.S. Cl. .............................................. 290/55; 416/9
(58) Field of Classification Search .................... 290/44, 290/54, 55; 416/9; 415/4.3
See application file for complete search history.

(56) References Cited

U.S. PATENT DOCUMENTS

| | | | | |
|---|---|---|---|---|
| 4,323,331 | A * | 4/1982 | Schachle et al. | 416/9 |
| 5,213,470 | A * | 5/1993 | Lundquist | 416/9 |
| 7,891,939 | B1 * | 2/2011 | Zuteck | 415/4.3 |
| 2008/0150292 | A1 * | 6/2008 | Fedor et al. | 290/55 |
| 2011/0018269 | A1 * | 1/2011 | Moser et al. | 290/44 |

* cited by examiner

*Primary Examiner* — Nicholas Ponomarenko
(74) *Attorney, Agent, or Firm* — Leong C. Lei

(57) ABSTRACT

A horizontal axis wind turbine with rotatable tower including nacelle and blades. The tower, the blades, and the nacelle are rotatable by following the shift of wind direction so as to align the blades to be facing with the wind direction for enhancing performances thereof. Also can eliminate the gearbox, as compared to the conventional horizontal axis wind turbine that the nacelle is not completely fixed with tower, the present invention is easy to manufacture with reduced costs.

9 Claims, 6 Drawing Sheets

HORIZONTAL AXIS WIND TURBINE WITH ROTATABLE TOWER

(a) TECHNICAL FIELD OF THE INVENTION

The present invention generally relates to a horizontal axis wind turbine (HAWT) with a rotatable tower, and particularly to a wind turbine structure of which a tower, blades, and a nacelle are rotatable with the change of wind direction.

(b) DESCRIPTION OF THE PRIOR ART

The horizontal axis wind turbine (HAWT) is defined that axis of rotation is parallel to the ground surface, as shown in FIG. 1 of the attached drawings. The conventional HAWT comprises a yaw gear and bearing assembly 11, a tower 12, and a nacelle 13. The nacelle 13 comprises a gear box, a brake, and a generator . . . etc. Blades 14 are rotatably attached to the shaft in nacelle 13. Reference numeral 10 indicates wind direction.

The tower 12 is fixed to the ground 01 while the nacelle 13 and the blades 14 are rotated with the change of wind direction 10. Thus, the yaw gear and bearing assembly 11 that couples between the tower 12 and the nacelle 13 must bear the weights of the blades 14 and the nacelle 13, as well as various forces and torques, including the wind power and the torque induced by a direction-change motor. This makes the mechanical structure of the yaw gear and bearing assembly 11 relatively weak and the manufacturing is difficult with added costs. In view of this issue, the present invention aims to provide a HAWT that can be easily manufactured with a reduced cost.

SUMMARY OF THE INVENTION

A primary objective of the present invention is to provide a HAWT with a rotatable tower, wherein the tower of the wind turbine, blades, and a nacelle are rotatable together in response to the shift of wind direction so as to make the wind power generation technique simple, the manufacturing easy, and the costs reduced.

In the HAWT with a rotatable tower described above, the tower and the nacelle of the HAWT are completely fixed together to make the mechanical structure quite simply, and the tower is fit in a hollow circular base mounted on the ground to have the weight thereof supported by one or plural steel spheres on the bottom of the base. Bearings or simply-structured movable steel rings or steel balls are arranged between a circumferential wall of the base and the tower. Outside the tower, a yaw motor and gearing or a simple winch, or instead, a tail fin, is provided. Thus, when the nacelle and the blades are rotated with the shift of wind direction, the tower is rotated too and various forces and torques acting upon the gearing and bearings are separated.

In the HAWT with a rotatable tower described above, the weights of the blades, the nacelle, and the tower are carried by the steel sphere(s) on the bottom of the base and the weight of the yaw gear box and motor or winch is supported by the ground.

In the HAWT with a rotatable tower described above, head wind power is taken by the base and the steel bearing rings thereof, and the torque of the yaw motor for changing direction is carried by a gear mounted to the tower.

In the HAWT with a rotatable tower described above, the nacelle can be arranged at a lower location by using power transmission apparatus to transmit power from shaft to electricity generator to reduce the bending torque applied to the tower, also can eliminate the gearbox, so as to make the wind turbine technique simple, the manufacturing easy, and the costs reduced.

In the HAWT with a rotatable tower described above, a tail fin is selectively used to replace the yaw motor and the tail fin is made of metal plates and/or plastic boards, or made of canvas and/or plastic sheets so as to be automatically rolled up in case of strong winds to avoid receiving the strong force of the winds.

In the HAWT with a rotatable tower described above, the main rotational shaft can be provided with support strut that are supported by rollers for supporting front and rear ends of the shaft.

In the HAWT with a rotatable tower described above, the base can be mounted to a floatable platform on sea surface and the platform is anchored by a cable attached to a submarine foundation.

The foregoing objective and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
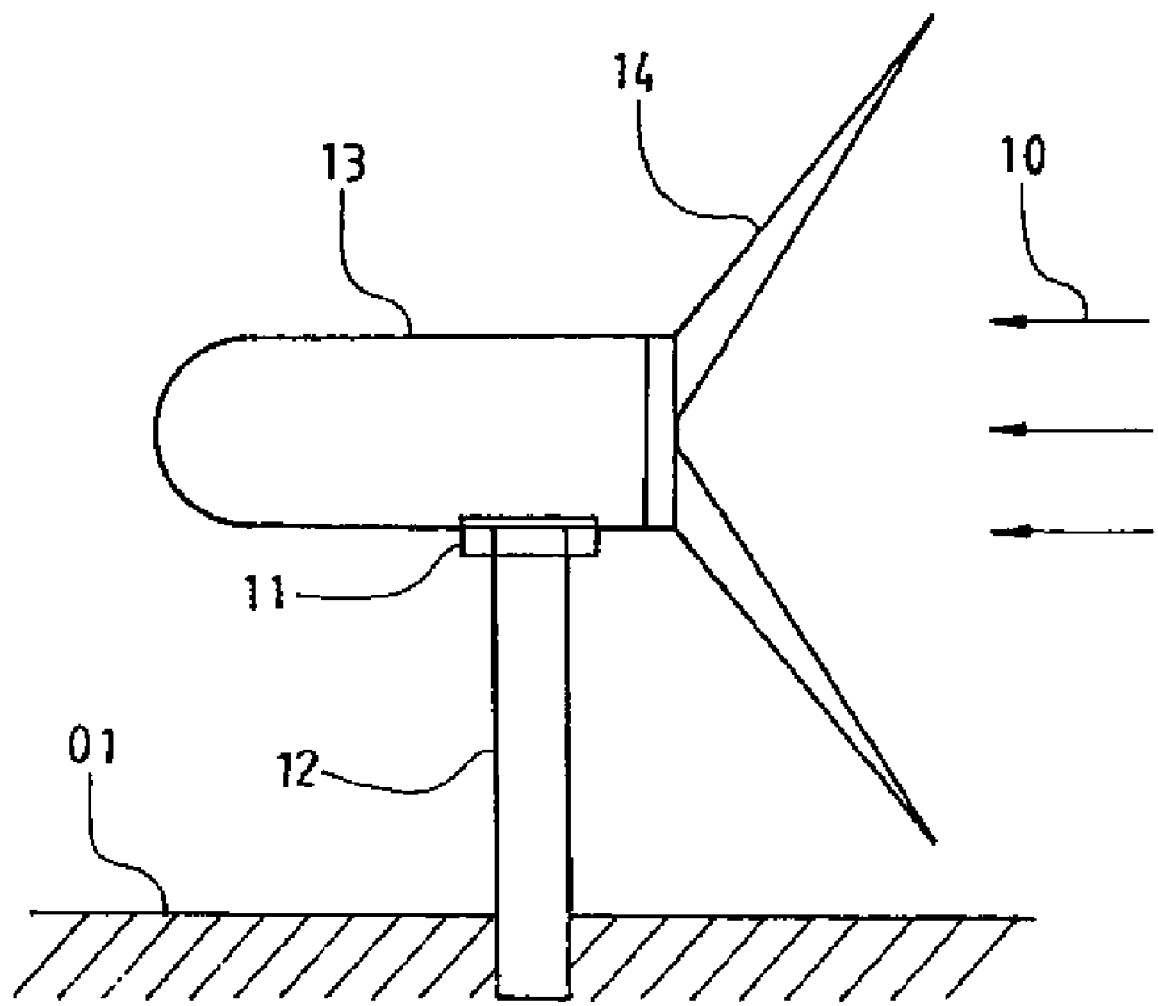
FIG. 1 schematically shows the structure of a conventional wind turbine.
Figure 2:
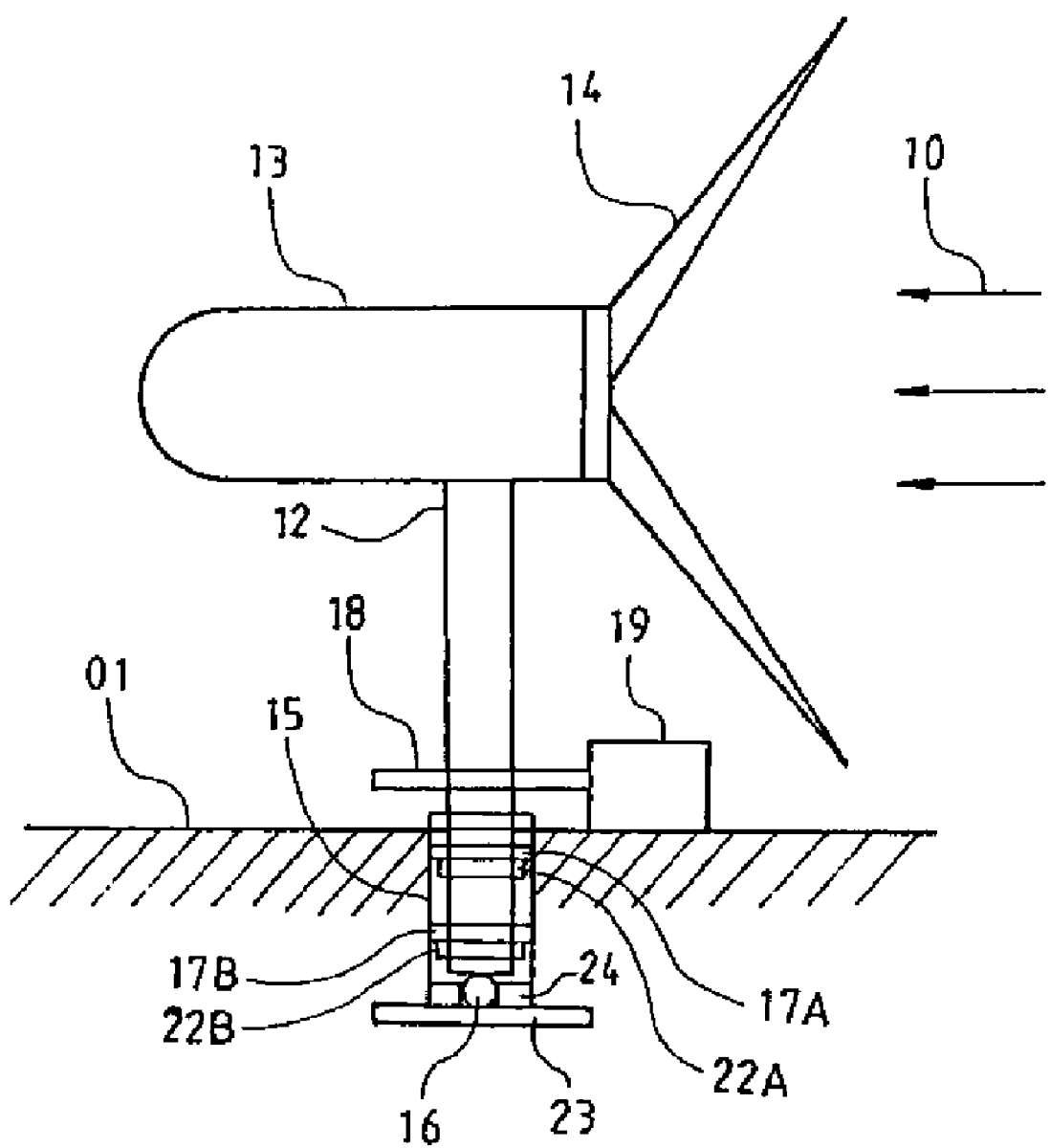
FIG. 2 is a schematic view showing a structure of the present invention.

With reference to the drawings and in particular to FIG. 2, the present invention provides an arrangement where the nacelle 13 and the tower 12 are completely fixed together so as to eliminate the yaw gear and bearing assembly 11 that is adopted in the conventional horizontal axis wind turbine (HAWT) illustrated in FIG. 1 and thus making the mechanical structure quite simply so that the manufacturing of the HAWT become easy and the costs reduced.

A base 15 is made of steel tube buried under the ground 01 (or alternatively mounted to a floating platform, which will be described later). The tower 12 is fit into the base 15 and rests on a steel balls assembly 16, which may comprise a single steel balls 16 or a plurality of steel balls 16. The steel balls 16 is supported by a base board 23 and is retained by a retention ring 24. The retention ring 24 can be set along an outer circumference or at a center to work with a plurality of steel balls 16. Bearings or rotatable flat steel rings with round arc in edges or steel balls 17A, 17B are arranged between the tower 12 and a circumferential wall of the base 15 to accommodate the rotation of the tower 12 and the bearings 17A, 17B are respectively retained in positioned by support rings 22A, 22B that are fixed to the tower 12.

The outside of base 15 can be surrounded by concrete also the lower part of hollow tower 12 can be filled by hard materials such as cement to increase the strength.

A gear 18 is mounted to the tower 12 and is driven by a yaw gear and a yaw motor 19 in response to detection of wind direction by a wind vane or an anemometer (not shown) to rotate the tower 12 in order to align the blades 14 to be facing with wind direction.

With the above arrangement, the forces and torques that the conventional yaw gear and bearing assembly 11 must take can be separated as follows:

(1) The weights or gravities of the nacelle 13, the tower 12, and the blades 14 are carried by the steel sphere(s) 16 and the base board 23.

(2) The weight of the yaw gear box and the motor 19 is supported by the ground or other support frames.

(3) Head wind power is taken by the bearings 17A, 17B and the base 15.

(4) Torque for changing direction is carried by the gear 18.

Thus, the stress induced in each component is made relatively low, and without the 11 yaw gearing and bearing of FIG. 1 will make the mechanical structure simple and the manufacturing cost reduced.

Figure 3:
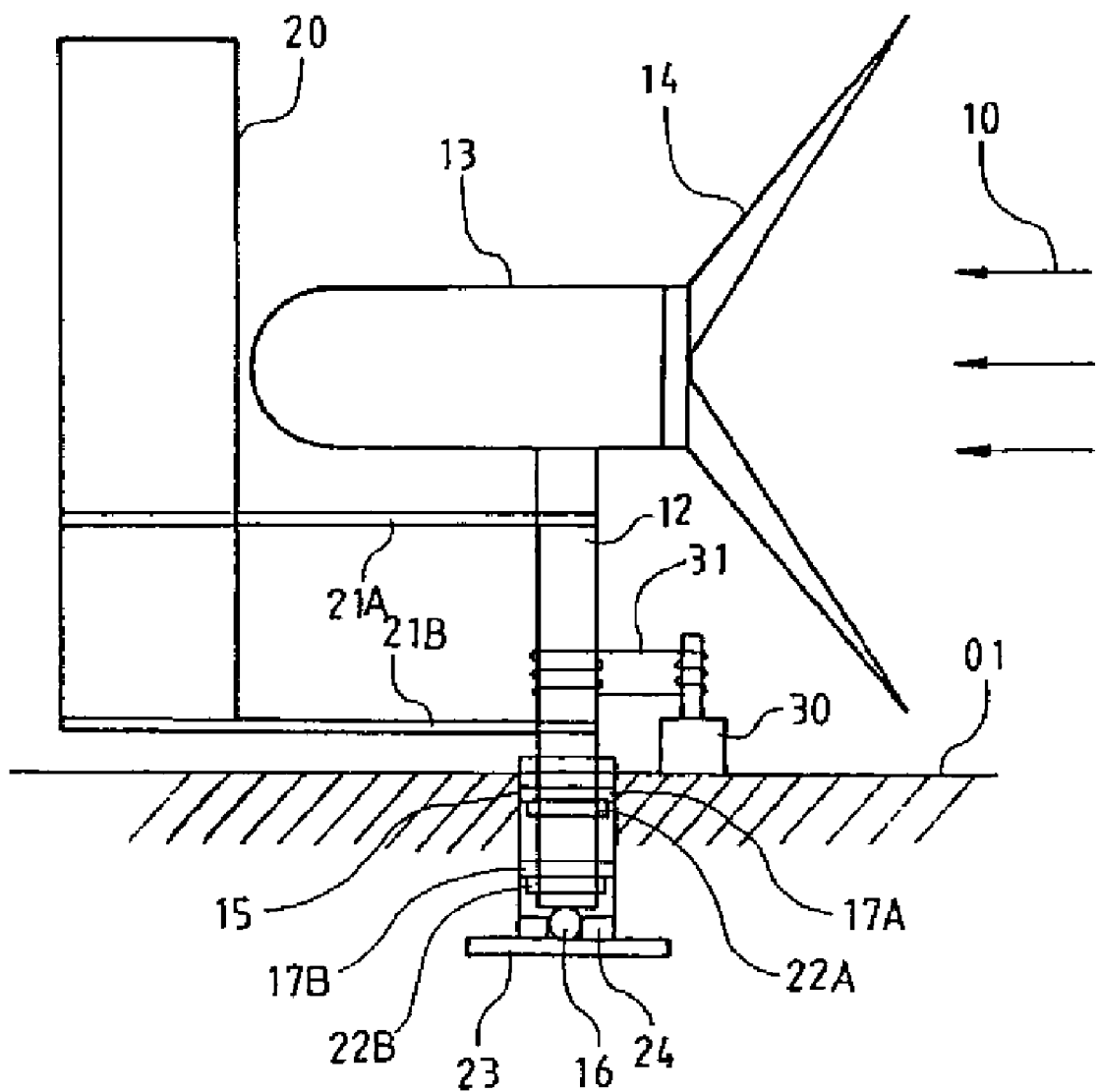
FIG. 3 is a schematic view showing a modified embodiment of the structure of the present invention.

Referring to FIG. 3, another embodiment that replaces the yaw gear box and the motor 19 in accordance with the present invention is shown, wherein a winch 30 that winds up a steel cable 31 and rotates forwards/backward in response to a signal indicating wind direction or alternatively and/or additionally, a tail fin 20 is used to as the replacement. The tail fin 20 or the winch 30 rotates the tower 12 with the wind direction so as to align the blades 14 with the wind direction. In case that the tower 12 has been rotated for many turns that cannot be tolerated by an electrical cable connected thereto, the winch 30 is automatically actuated in such a way to return the tower 12 back to the home position. The tail fin 20 is mounted to the tower 12 through support frames 21A, 21B. The tail fin 20 is made of metal plates and/or plastic boards, or made of canvas and/or plastic sheets so as to be automatically rolled up in case of strong winds that have a speed greater than 30 n/sec and be protected against damage caused by the winds.

Figure 4:
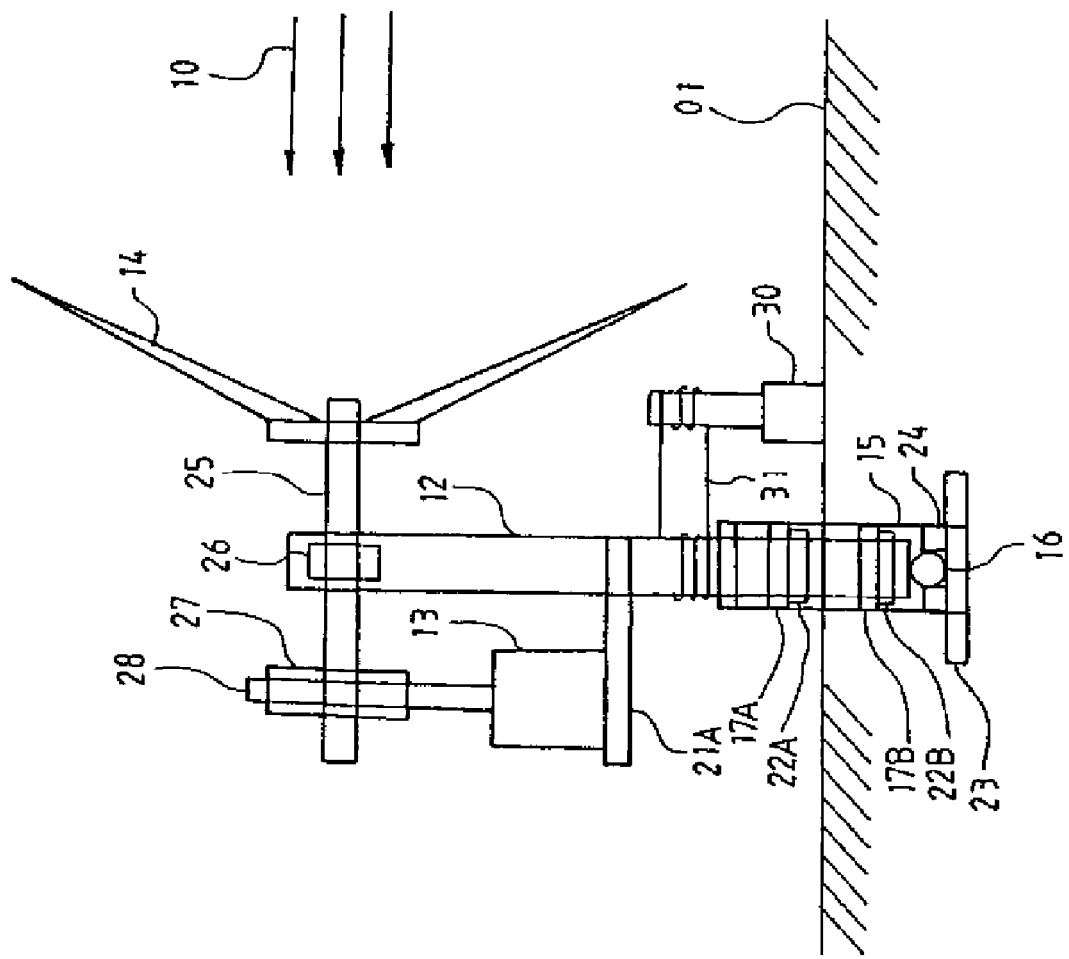
FIG. 4 is a schematic view showing a further embodiment of the structure of the present invention.

Referring to FIG. 4, the nacelle 13 can be selectively arranged at a lower location, such as mounting the nacelle 13 on a support frame 21A. The main rotational shaft 25 is supported by a bearing 26 or multiple bearings on the tower 12. A power transmission apparatus such as gear wheel or pulley . . . etc. 27 is fixed to the main rotational shaft 25 and is coupled to the nacelle 13 through a gear chain or a cable 28 for transmitting of power to the nacelle 13 for electricity generation. In this way, the torque that the nacelle 13 applied to the tower 12 can be much reduced and rotational speed can be increased without the traditional gear box in 13 nacelle.

Figure 5:
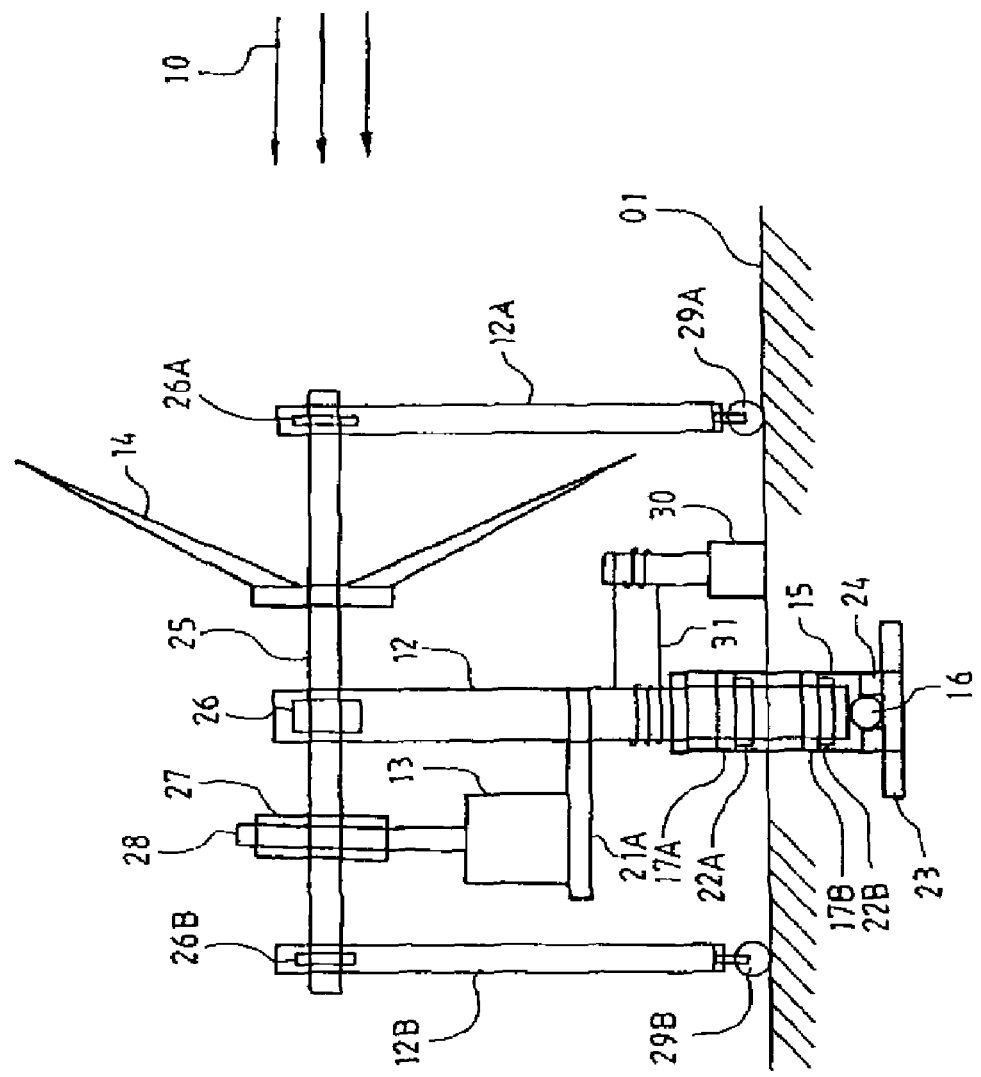
FIG. 5 is a schematic view showing yet a further embodiment of the structure of the present invention.

Referring to FIG. 5, an arrangement can be made that multiple support frames or racks are used to support the primary rotational shaft 25. In the illustrated arrangement, supplement towers 12A, 12B are arranged to support the main rotational shaft 25 through bearings 26A, 26B and stand on ground 01 by rollers 29A, 29B, in order to allow the tower 12 to freely rotate.

Figure 6:
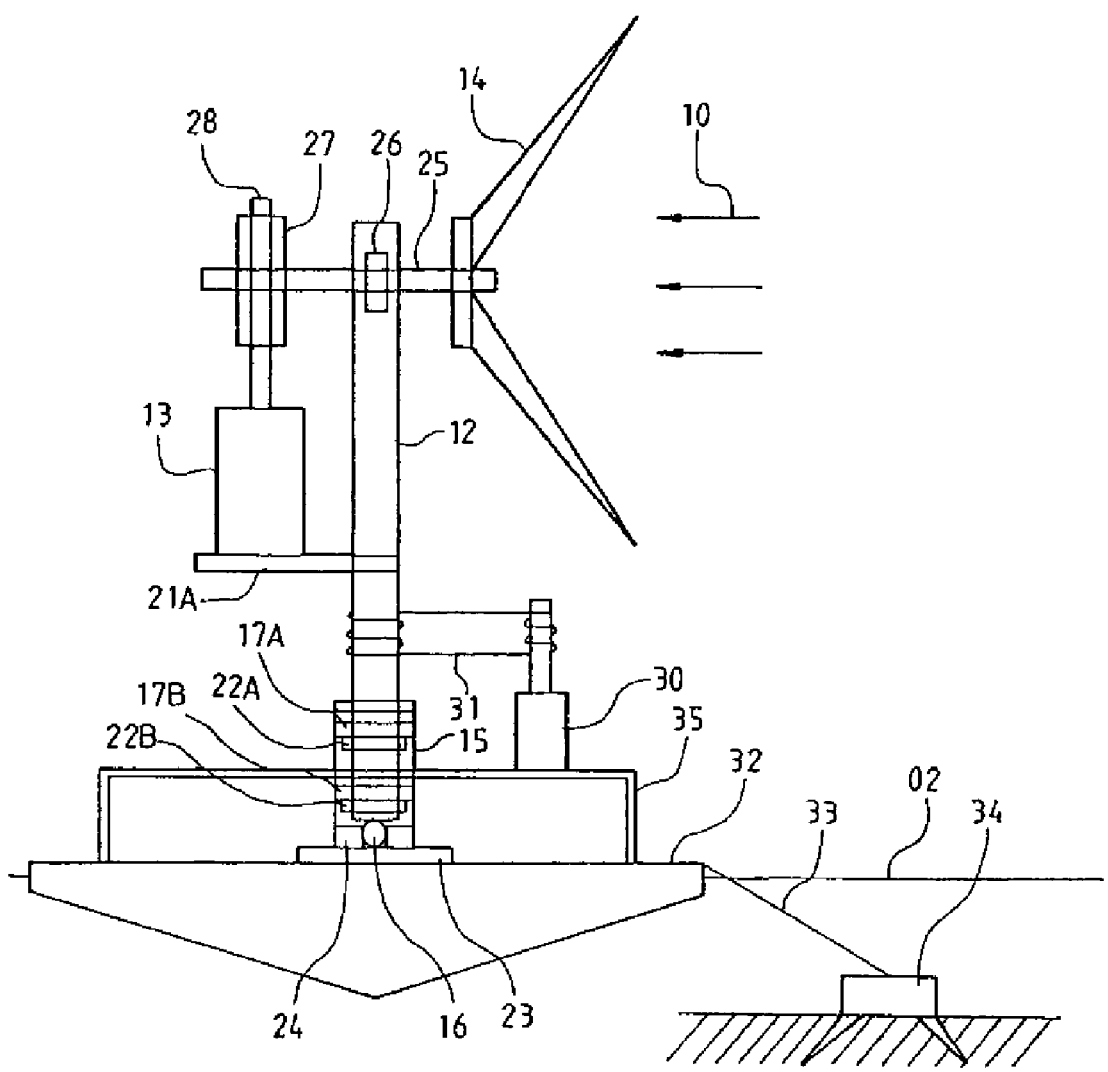
FIG. 6 is a schematic view showing a further embodiment of the structure of the present invention that is mounted to a platform on sea surface.

Referring to FIG. 6, the present invention provides an alternative arrangement where the base 15 is mounted on a floatable platform 32 that floats on sea surface 02 and is retained by a retention rack 35. The floatable platform 32 is anchored by rope or cable that is fixed to a submarine foundation 35 to prevent floating away.

To summarize, the present invention combine the tower, the nacelle, and the blades attached to the nacelle together to allow the tower, the nacelle, and the blades of the HAWT to rotate with the shift of wind direction also it can be able to eliminate the gear box, so that the HAWT techniques are made simple, manufacturing easy, and cost reduced.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A horizontal axis wind turbine with a rotatable tower, wherein the tower is fit to a hollow circular base, a yaw motor and a gear being mounted outside the tower, the yaw motor being fixed to the ground and functioning to rotate the tower, whereby when the tower rotates to follow direction of winds, blades and nacelle of the wind turbine rotate with the tower to align the blades to be facing with the wind direction for enhancing operation gain.

2. The horizontal axis wind turbine according to claim 1, wherein both the tower and the circular base have equipped bottom chassis thereof and wherein the steel balls is put in between the two bottom chassis to facilitate rotation of the tower, rotatable flat steel rings with around are in edges or bearings or steel balls being placed between the tower and a circumferential wall of base to allow the rotation of the tower.

3. The horizontal axis wind turbine according to claim 1, wherein the tower and the nacelle, are completely fixed together whereby when the tower rotates, the nacelle and the blades are both caused to rotate therewith.

4. The horizontal axis wind turbine according to claim 1, wherein the tower comprises a hollow steel tube or the tower is filled with hard materials such as cements to increase the strength thereof.

5. The horizontal axis wind turbine according to claim 1, wherein the rotation of the tower is carried out by an assembly of a yaw motor and gearing fixed on the ground, or a winch, in response to a signal from an anemometer and vane also can be a tail fin mounted on the tower.

6. The horizontal axis wind turbine according to claim 1, wherein the base is installed on the ground or mounted to a floatable platform on a sea, the floatable platform being anchored by a cable to a submarine foundation.

7. The horizontal axis wind turbine according to claim 1, wherein the nacelle is set at a lower location and is supported by a support frame fixed to the tower, using power transmission apparatus between the nacelle and the main rotational shaft to being coupled together for power transmission from the shaft to electricity generator.

8. The horizontal axis wind turbine according to claim 7, wherein the power transmission apparatus are arranged in a multiple-staged configuration to increase rotation speed and eliminate the traditional gear box in nacelle.

9. The horizontal axis wind turbine according to claim 7, wherein the main rotational shaft comprises one or two supplement towers for supporting, the supplement towers being movably supported on the ground by rollers to allow rotation with the tower

* * * * *